(No Model.)
2 Sheets—Sheet 1.
J. W. HYATT.
ABRASION OF FILTER DIAPHRAGMS.
No. 364,936. Patented June 14, 1887.
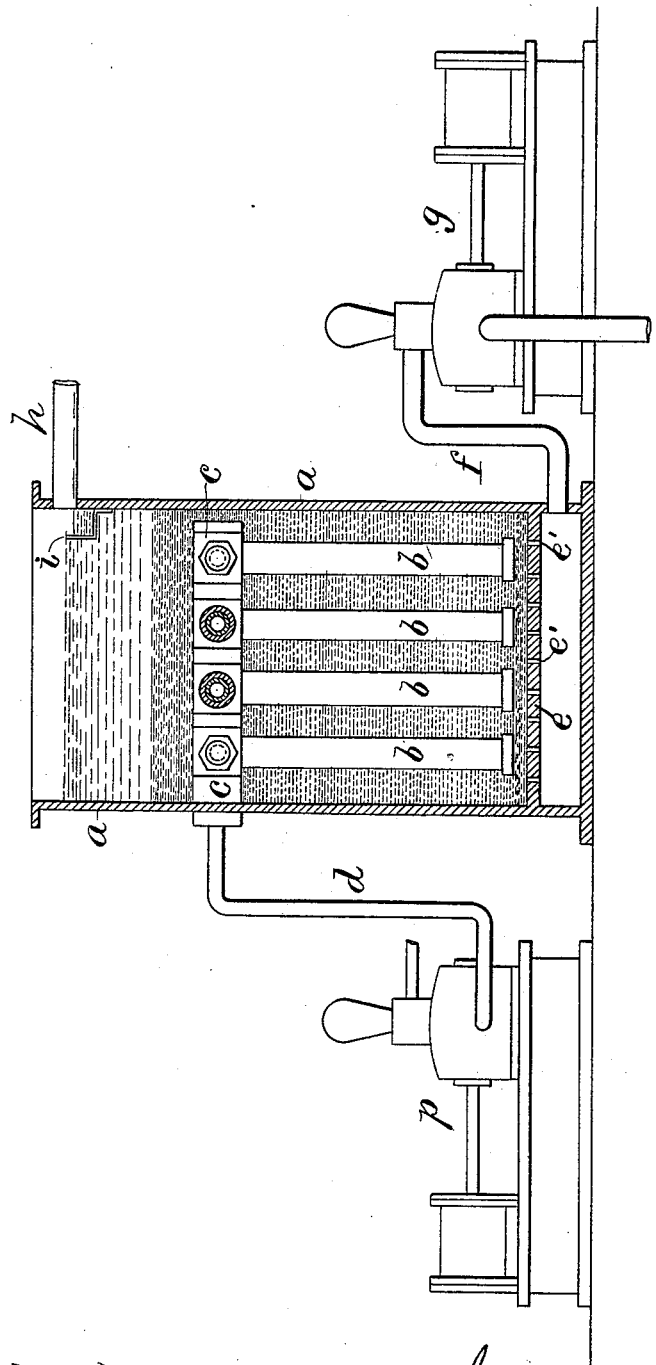
Attest:
L. Lee,
Wm Smith Morison.
Inventor.
John W. Hyatt, per
Crane & Miller, attys.

(No Model.) 2 Sheets—Sheet 2.
J. W. HYATT.
ABRASION OF FILTER DIAPHRAGMS.
No. 364,936. Patented June 14, 1887.
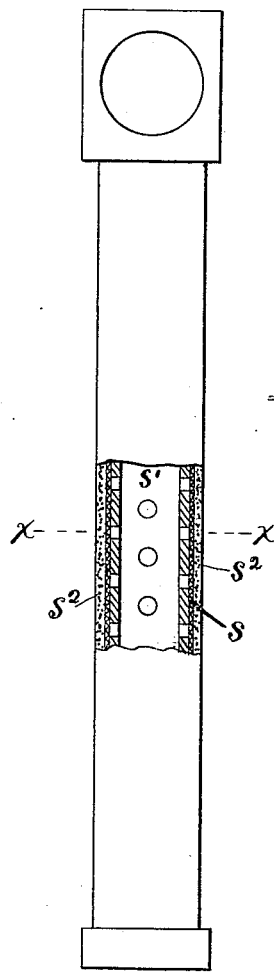
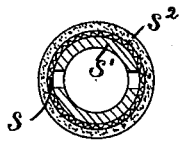
Attest:
L. Lee.
F. G. Fischer
Inventor.
John W. Hyatt per
Crane & Miller, Attys.

UNITED STATES PATENT OFFICE.

JOHN W. HYATT, OF NEWARK, NEW JERSEY.

ABRASION OF FILTER-DIAPHRAGMS.

SPECIFICATION forming part of Letters Patent No. 364,936, dated June 14, 1887.

Application filed March 7, 1887. Serial No. 229,949. (No model.)

*To all whom it may concern:*

Be it known that I, JOHN W. HYATT, a citizen of the United States, residing at Newark, Essex county, New Jersey, have invented certain new and useful Improvements in Abrasion of Filtering-Diaphragms, fully described and represented in the following specification and the accompanying drawings, forming a part of the same.

This invention is intended to increase the efficiency or capacity of porous filtering-diaphragms; and it consists in the use of a suction-pump for inducing a vacuum within such diaphragms or filtering media, and in continuously passing over the surfaces of such diaphragms a volume of water in excess of that which can be filtered, to agitate, in contact with the diaphragms, granular abrading material to remove the impurities deposited thereon. By this construction a very rapid percolation of the fluid through the porous diaphragms is secured, and the surfaces are kept continuously cleansed, so as to operate with the utmost efficiency.

The diaphragms may be of tubular form, or rectangular or prismatic, and are shown herein as square prisms, constructed according to the specification in my patent application No. 224,210, filed January 13, 1887.

Figure 1 is a diagram showing a filter having its casing in section where hatched, and containing a series of tubular filtering-diaphragms connected with a suction-pump, and the bottom of the casing being also connected with a separate force-pump. Fig. 2 is a side view of one of the tubular filter-diaphragms, with one portion broken away to show its porous construction, and Fig. 3 is a transverse section on line *x x* in Fig. 2.

In the drawings, *a* is the filter-casing, which is shown open at the top, but may be closed, if desired.

*b* are the filtering-diaphragms, presenting a porous filtering-surface upon all their external sides, and provided internally with a passage for the fluid to a header, *c*. Such header is connected by a pipe, *d*, with the suction-inlet of a pump, *p*.

The filter-diaphragm shown herein is formed by wrapping wire-gauze *s* around a perforated metallic tube, *s'*, and applying outside of the wire-gauze a coating of artificial stone, $s^2$. This construction of the diaphragm is not claimed herein, as it forms no part of my present invention.

A false bottom, *e*, is placed within the filter-casing beneath the diaphragms to sustain a mass of granular abrading material in contact with the diaphragms, and perforations *e'* are made through such false bottom to admit a current of fluid among the sand and diaphragms. Such fluid is supplied through a pipe, *f*, by a force-pump, *g*, and is furnished in a greater volume than the diaphragms are capable of filtering, to induce a violent agitation of the abrading material against their surfaces. The surplus of fluid is discharged from the upper part of the filter by any convenient means, as the pipe *h*, the aperture of the pipe being guarded by a baffle-plate, *i*, and the sand being used of such size and gravity as to remain within the casing.

My construction operates as follows: The fluid, being delivered within the casing by the pump *g*, is drawn through the porous surfaces of the diaphragms *b* by the suction of the pump *p*; and the constant agitation of the sand or other granular material against the surfaces of the diaphragms serves to remove the impurities therefrom, while the flow of water from the pipe *h* continuously removes such impurities from the casing, and thus maintains the diaphragms in a clean and efficient condition.

I hereby disclaim my patent application No. 219,574, filed November 23, 1886, in which I have claimed, broadly, the use of abrading material agitated with the unfiltered fluid to cleanse the surface of a permanent porous filtering-diaphragm, whatever the shape of the latter may be.

In practicing my present invention "coke breeze" or any suitable abrading material may be used, and the false bottom *e* may be replaced with fine gravel or any required form of strainer on the end of the inlet-pipe, to prevent the granular material from clogging the same.

It will be noticed that the sand or other abrading material introduced into the filter-casing is manifestly not designed to perform filtering functions, and that any filtration effected by such abrading material is wholly immaterial to the process of the invention itself.

Having thus set forth my invention, what I claim herein is—

The combination, with an open filter-casing, of porous diaphragms supported therein and having their outlet connected with a suction-pump, granular material in the casing in contact with such diaphragms, a force-pump supplying a current of water to the casing through such granular material, and an overflow from the upper part of the casing, the whole being arranged and operated for the force-pump to supply the water for filtration and an excess of water for agitating the abrading material, such excess flowing continuously from the casing to remove the impurities, and the suction-pump operating to draw the fluid through the porous diaphragms, as and for the purpose set forth.

In testimony whereof I have hereunto set my hand in the presence of two subscribing witnesses.

JOHN W. HYATT.

Witnesses:
FRANK L. MORTON,
THOS. S. CRANE.